US007756692B2

(12) United States Patent
Glass, III et al.

(10) Patent No.: US 7,756,692 B2
(45) Date of Patent: Jul. 13, 2010

(54) CROWD BEHAVIOR MODELING METHOD AND SYSTEM

(75) Inventors: Thomas G. Glass, III, San Antonio, TX (US); Arthur N. Rasmussen, San Antonio, TX (US); John D. Micheletti, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 781 days.

(21) Appl. No.: 11/273,315

(22) Filed: Nov. 24, 2005

(65) Prior Publication Data

US 2006/0178860 A1   Aug. 10, 2006

Related U.S. Application Data

(60) Provisional application No. 60/627,265, filed on Nov. 12, 2004.

(51) Int. Cl.
G06G 7/48        (2006.01)
G06F 7/60        (2006.01)
(52) U.S. Cl. .............................................. 703/6; 703/2
(58) Field of Classification Search ................... 703/6, 703/2
See application file for complete search history.

(56) References Cited

U.S. PATENT DOCUMENTS 6,714,201 B1 *   3/2004   Grinstein et al. ............ 345/474
7,130,779 B2 *  10/2006   Beverina et al. ................ 703/6
7,464,373 B1 *  12/2008   Yunt et al. ................... 717/125

OTHER PUBLICATIONS

Weaver et al., May, 2001, Modeling and Simulating Terrorist Decision-making: A "Performance Moderator Function" Approach to Generating Virtual Opponents, 10th Conf. On Computer Generated Forces and Behavioral Representation, SISO, pp. 1-6.*
Veatch et al., Oct. 1999, An Airport Vulnerability Assessement Methodolgy, 1999 IEEE, pp. 134-151.*
Martz et al., 1987, Society for Risk Analysis, Risk Analysis of Terrorist Attacks, vol. 7 pp. 35-47.*
Johns et al., May 2001, How Emotion and Personality Effect the Utility of Alternative Decisions: A Terrorist Target Selection Case Study, 10th Conf. On Computer Generated Forces and Behavioral Representation, SISO.*
Sato el al, Autonomous Behavior Control of Virtual Actors Based on the AIR Model, Computer Animation '97 Eneva, Switzerland, Jun. 5-6, 1997, pp. 113-118.*

* cited by examiner

Primary Examiner—Paul L Rodriguez
Assistant Examiner—Eunhee Kim
(74) Attorney, Agent, or Firm—Chowdury & Georgakis PC

(57)   ABSTRACT

A method and system for simulating aggregates of individuals, using large numbers of interacting, independent, and unique decision models in order to simulate and study various types of behaviors.

20 Claims, 16 Drawing Sheets

ARU LOG ENTRY LIST

```
[0]  Mv-SingleRnd:(323,295)>(322,298)
[3]  Mv-Primary:(321,298)>(319,298)
[6]  Mv-Primary:(319,298)>(317,298)
[9]  Mv-Primary:(317,298)>(315,298)
[12] Mv-Primary:(315,298)>(313,298)
[15] Mv-Primary:(313,298)>(311,298)
[18] Mv-Primary:(311,298)>(309,298)
[21] Mv-SingleRnd:(309,298)>(308,295)
[24] Mv-Primary:(307,294)>(305,296)
[27] Mv-Primary:(305,296)>(303,298)
[30] Mv-Primary:(303,298)>(301,299)
[33] Mv-Random:(301,299)>(299,300)
[36] Mv-SingleRnd:(299,300)>(301,303)
[39] Mv-Primary:(300,302)>(300,300)
[42] Mv-SingleRnd:(300,300)>(303,298)
[45] Mv-SingleRnd:(302,297)>(305,295)
[48] Mv-Primary:(304,294)>(303,296)
[51] Mv-SingleRnd:(303,296)>(303,298)
[54] Mv-Primary:(303,298)>(301,299)
[57] Mv-Random:(301,299)>(304,299)
[60] Mv-Primary:(304,298)>(302,299)
[63] Mv-Primary:(302,299)>(300,300)
[66] Mv-Random:(300,300)>(398,300)
[69] Mv-SingleRnd:(298,300)>(300,300)
[72] Mv-Primary:(299,300)>(299,300)
[75] Mv-SingleRnd:(299,300)>(298,302)
```

*FIG. 8*

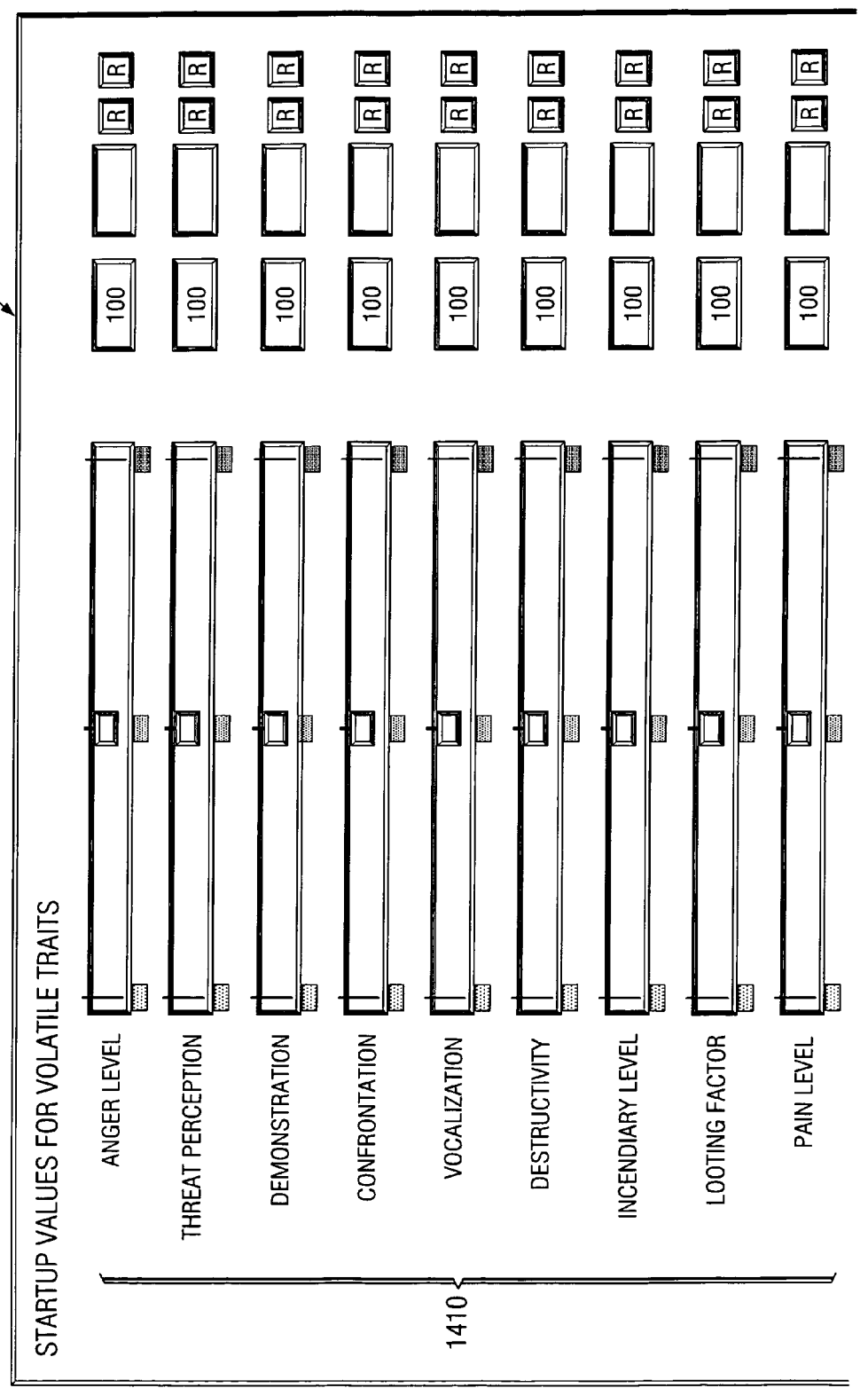

TO FIG. 15B

CROWD BEHAVIOR MODELING METHOD AND SYSTEM

CROSS-REFERENCE TO RELATED APPLICATIONS

This application claims the benefit of U.S. Provisional Application Ser. No. 60/627,265 filed Nov. 12, 2004, which is incorporated herein by reference in its entirety.

TECHNICAL FIELD OF THE INVENTION

This invention relates to software modeling and simulation, and more particularly to a method of modeling behavior of crowds and other aggregates.

BACKGROUND OF THE INVENTION

Understanding the behavior of aggregate collections of individuals is a fascinating concern and a challenging problem. There is a wide variety of such collections. One of the most complex challenges is understanding the behavior of humans in groups including both organized (e.g., military units) and loosely coupled types (e.g., mobs, demonstrators). The study of aggregate behavior extends into areas such as a terrorist network organization, herding behavior, and other collections where an aggregate is composed of a large number of individuals.

Recent national and world events have markedly increased the demand for research in this area, and have widened the desired scope of such research. Group demonstrations at home and abroad continue to be a popular form of social expression. Rioting following sporting events or other triggering occurrences and requiring judicious use of force has become more commonplace. National defense organizations face new challenges including unconventional and asymmetric conflict and heterogeneous crowd activities in urban settings. This has resulted in a greater need for understanding and predicting aggregate behaviors.

Existing single-entity, monolithic models are characterized primarily by a constrained paradigm requiring complete knowledge of the behavior of the aggregate as a whole. This makes it difficult or impossible to effectively and accurately model behaviors frequently seen in real-world scenarios.

On the other hand, existing "agent-based" approaches uses complex models for each agent. These systems tend to be heavy consumers of system processing resources.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 8 illustrates the logging of events during the scenario process.

DETAILED DESCRIPTION OF THE INVENTION

The invention described herein provides a "crowd behavior" analysis method and system. The system permits the user to build an aggregate by generating individual units but with a minimum of input effort. It provides a modeling and simulation environment with tools for building, simulating, and analyzing the behavior of aggregates. The tools provide unique ways of generating a number of individuals that comprise the aggregate and placing them in a physical environment (typically a map).

The units being modeled, may, but need not be humans. In the most general sense, they may be any unit that is capable of autonomous activity, real or simulated, animate or computer controlled. Any number of units may be modeled.

The method may be implemented with programming for a conventional data processing system. The system comprises memory, one or more processors, and various input and output devices.

The system described herein is "agent-based" in the sense that each individual is uniquely represented by a small data model. As explained below, however, probability-based techniques are used to average out quirky behavior that might otherwise prevent the aggregate from behaving realistically.

Figure 1:
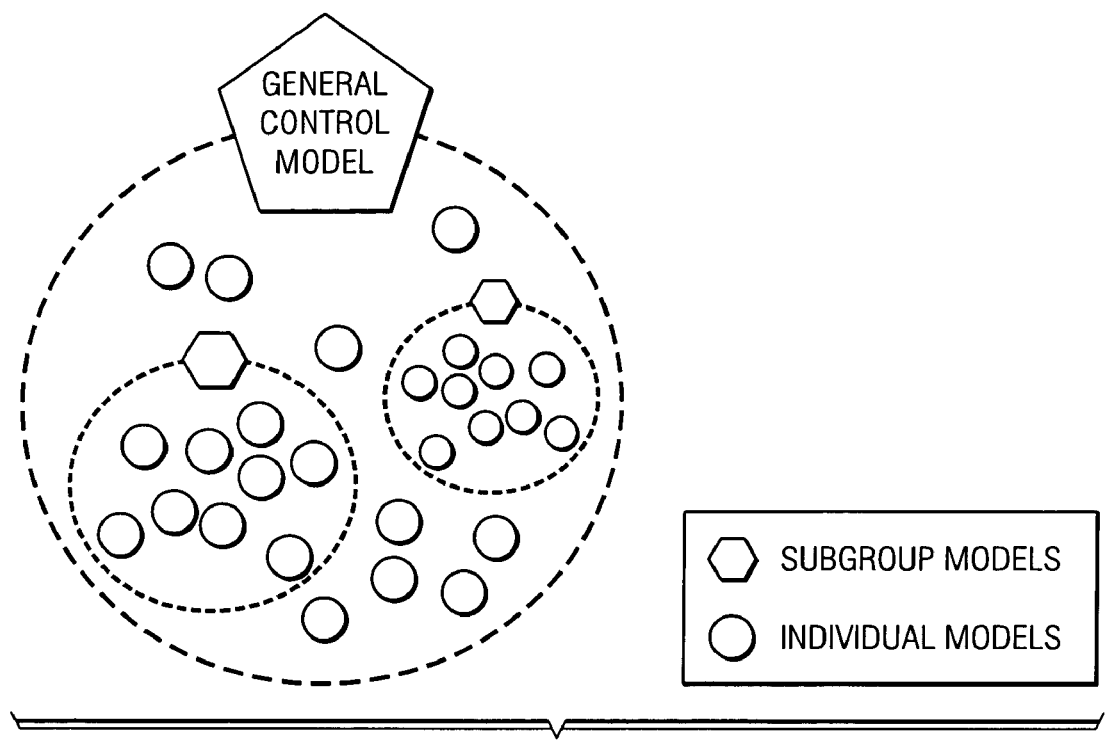
FIG. 1 illustrates the modeling of individuals and how they relate to each other in groups.

FIG. 1A illustrates the modeling of individuals and how they relate to each other when attempting to accomplish a group goal. This is done through an optional group hierarchy model. The user may initially assign units to groups. Units may opt into or out of the group or sub-group as dictated by their attributes.

This hierarchical system allows an analyst to provide customized scenario-level goals that eventually attract followers or repel dissenters.

It is from the combined actions of the large number of units that an analysis of the full aggregate is done. Unlike existing systems, the system does not model the aggregate as a whole, but relies on the interactions of units with the environment and other units. This provides a more accurate depiction of crowd behavior.

Figure 2:
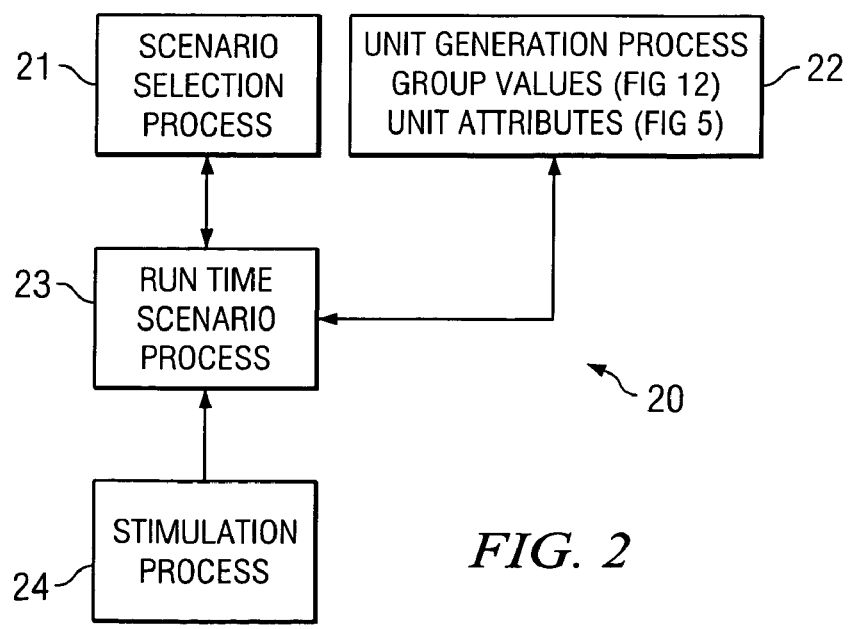
FIG. 2 is an overview of an aggregate modeling processing system in accordance with the invention.

FIG. 2 is an overview of an aggregate modeling system 20 in accordance with the invention. As discussed below in connection with FIG. 3, scenario selection process 21 permits the user to select a scenario. A unit generation process 22 permits the user to generate the groups and units within groups, each unit having specified attributes.

A run time scenario process 23 animates a crowd scenario by animating icons representing units. Process 23 is stimulated by stimuli provided by stimulation process 24. Various stimuli affect the behavior of the units, depending on their attributes. For example, a stimuli, such as the introduction of tear gas or a weather change, might affect different units differently. The unit generation process 22 may include the selection of decision models, which may be associated with units, and determine how a unit (with its unique attributes) will decide to respond to a stimulus.

Unit generation process 22 is used for building an aggregate from a large number of units. It should be understood that the same tools described herein for generating units may also be used for editing them after they are initially generated. As explained below, the unit generation process 22 uses statistical methods to permit unit to have individual characteristics but to be generated en masse.

The unit generation process 22 allows easier and more robust assimilation of new or improved data into the models. This then propagates from the individual level up to the aggregate level allowing incremental, feedback-driven improvements in crowd modeling as better data becomes available.

As explained below, individuals are modeled in a number of ways. Examples are:

A set of physical attributes related to position, size, heading, gender, etc.

A set of personality continua such as passive-aggressive, leader-follower, etc.

A set of communications characteristics for passing or degrading messages and information Visualization attributes for map display-tags, colors, group typing Skill sets for use of vehicles, tools, climbing, swimming, etc.

Group affiliations (both permanent and volatile)

System 20 is implemented with computer processing equipment, programmed in accordance with the methods and techniques described herein.

Process 22 generates at least four types of run time units. Aggregate run time units (ARU's) are part of the aggregate. Run time independent units (RIN's) are "neutral" units that are not part of the aggregate. Non aggregate actor units (NAU's) are units that do not communicate as part of the aggregate, such as military or police units. Vehicles (VEH's) are a fourth example of run time units.

Figure 3:
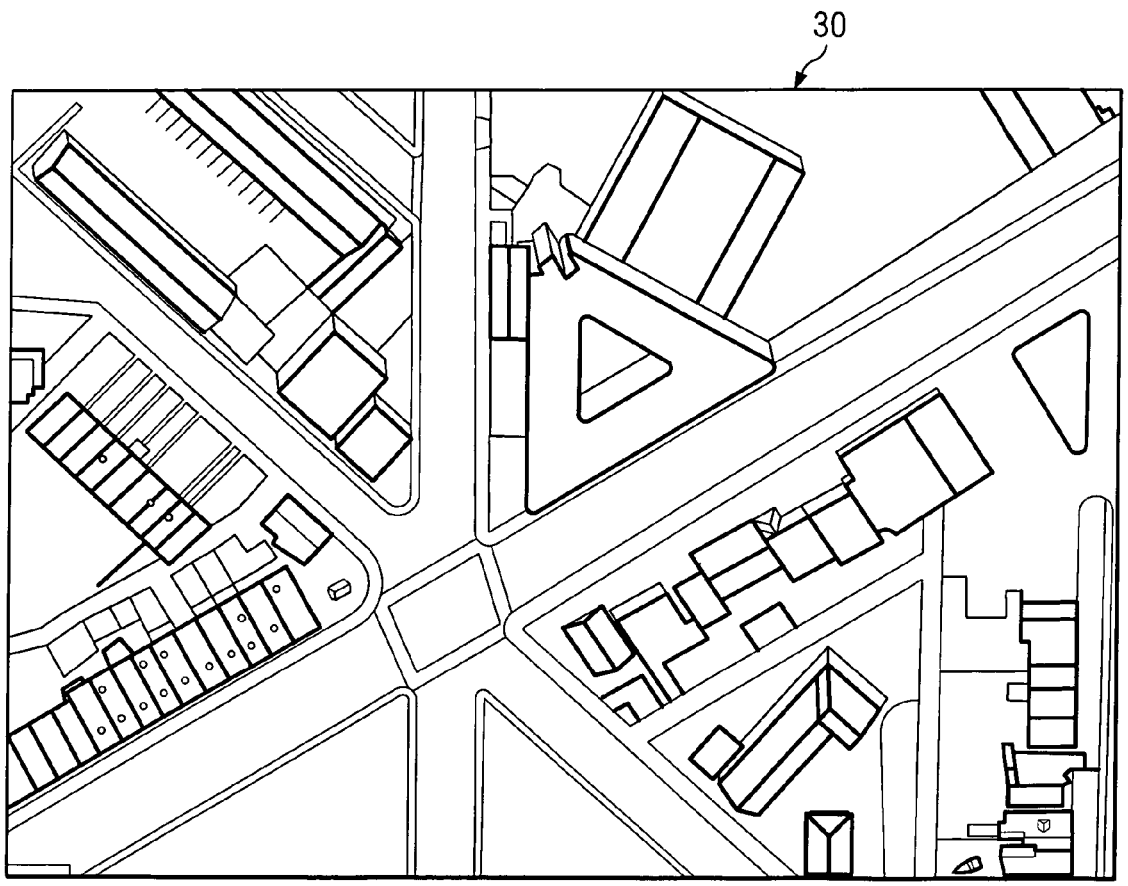
FIG. 3 illustrates a map display screen generated by the scenario selection process.

FIG. 3 illustrates a map display screen 30, as displayed by scenario process 23. Typically, locations are represented as realistic geographical locations, such as by photos, but other types of diagrams and maps may be used.

As explained below, each unit of the aggregate is represents by an icon on display 30. The icons may be animated or colored to indicate their attributes and behavior. In the example of FIG. 3, the scenario is located at a street intersection, with buildings in the same proximity.

Figure 4:
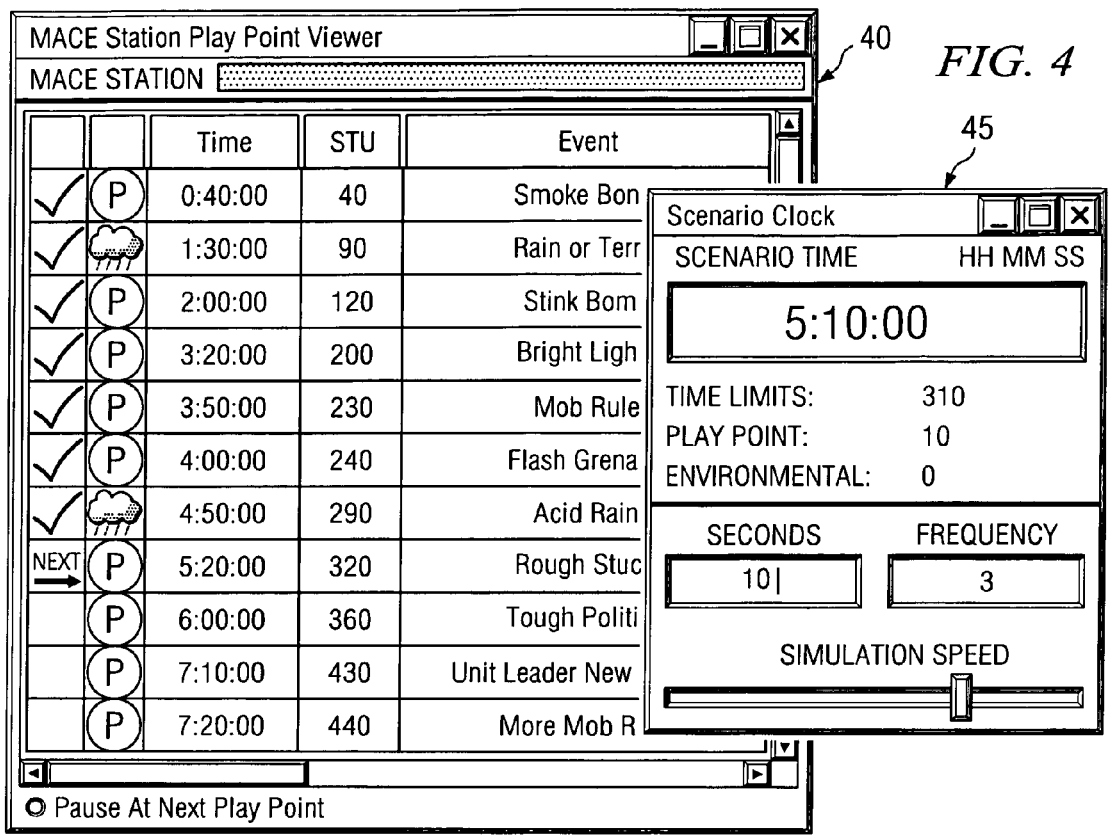
FIG. 4 illustrates an event process, which is part of the run time scenario process.

FIG. 4 illustrates an event process 40 and a scenario clock 45, which are part of scenario process 13. The user of system 20 can control scenario events by generating a timeline with specific events defined at selected times. These may include weather changes, introduction of various stimuli (e.g. non-lethal weapons, explosions, news and media vehicles, triggering events, etc.), addition of reinforcements, arrival of emergency personnel, and other timed events. Additional features built into system 20 allow visualization through animation, statistical displays, magnified views, and tagging of the units.

"Tagging" allows direct connections to attributes of each individual, thus providing immediate and graphic visualization of changes in attributes (e.g. anger level, threat perception, etc.) or states (e.g. movement states, decision states, health and energy levels, etc.).

Tools are also provided for introducing stimuli directly into the scenario by the analyst. This allows examination of multiple timelines from a common setup ("what if" scenarios). Additional tools allow examination of individual units, decision lists and logs, tracking by attachment of magnification windows to selected units, and group/sub-group monitor windows.

Scenario process 23 is an "engine", which manipulates the units in the physical environment and gathers decisions from each unit related to movement, actions, group interactions, and communications with other individuals. Group interactions provide numbers of individuals with an option to operate within the constraints of a group goal or mission.

Figure 5:
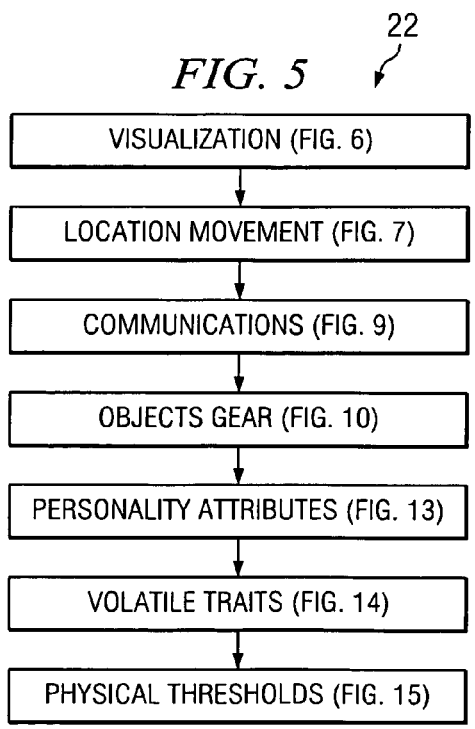
FIG. 5 illustrates various processes within the unit generation process.

FIG. 5 illustrates various processes used during unit generation process 22. As explained below, each of these processes assign different attributes to units. Many use statistical distribution methods to allow the user to generate units by group but still ensure that units are unique. FIGS. 6-11 and 13-15 illustrate these processes in further detail. Each of these Figures is of a display, and also represents the various computer processes that receive and process data entered on the displays, resulting in the generation of the aggregate and its subgroups and units.

Figure 6A:
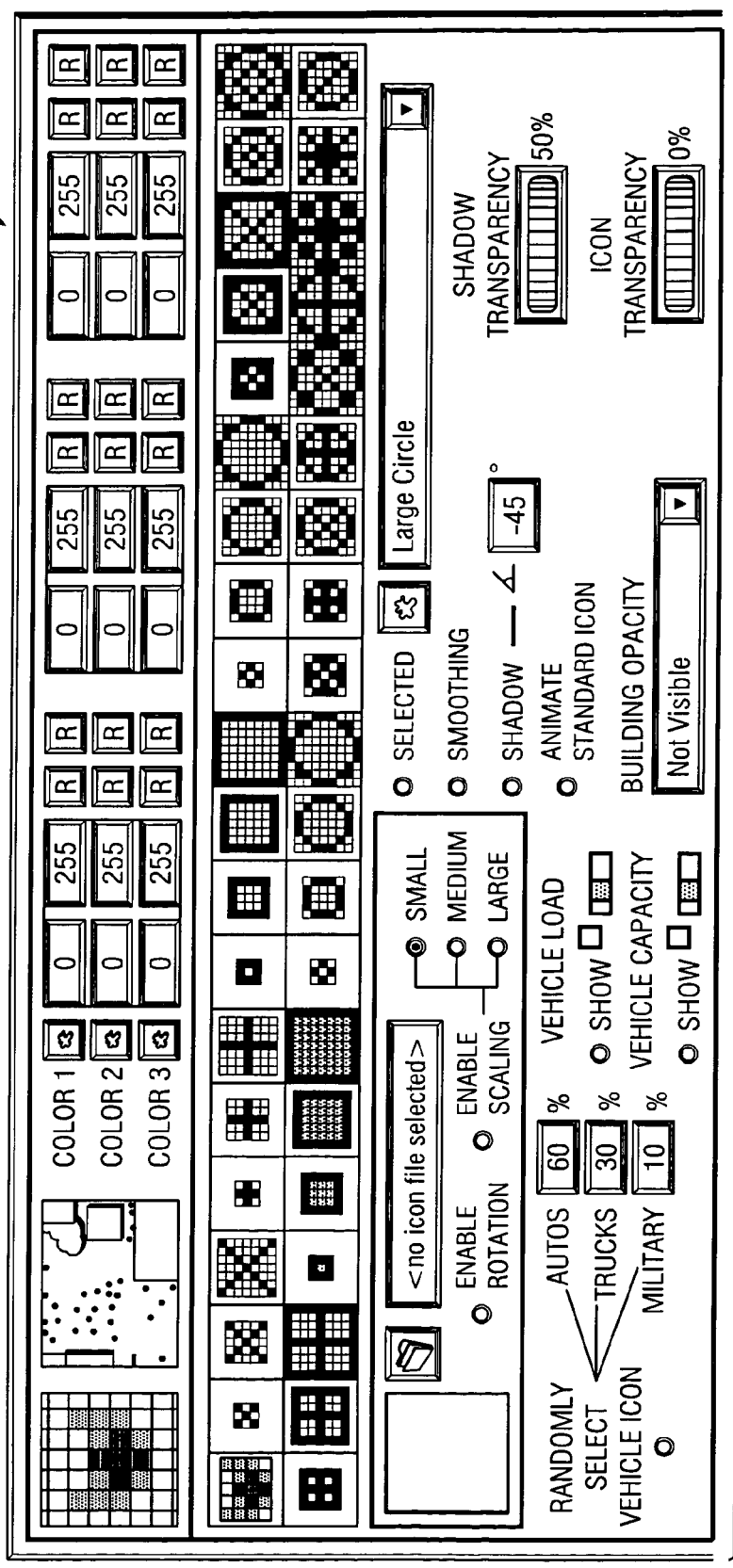
FIG. 6 illustrates the visualization process for unit generation.
Figure 6B:
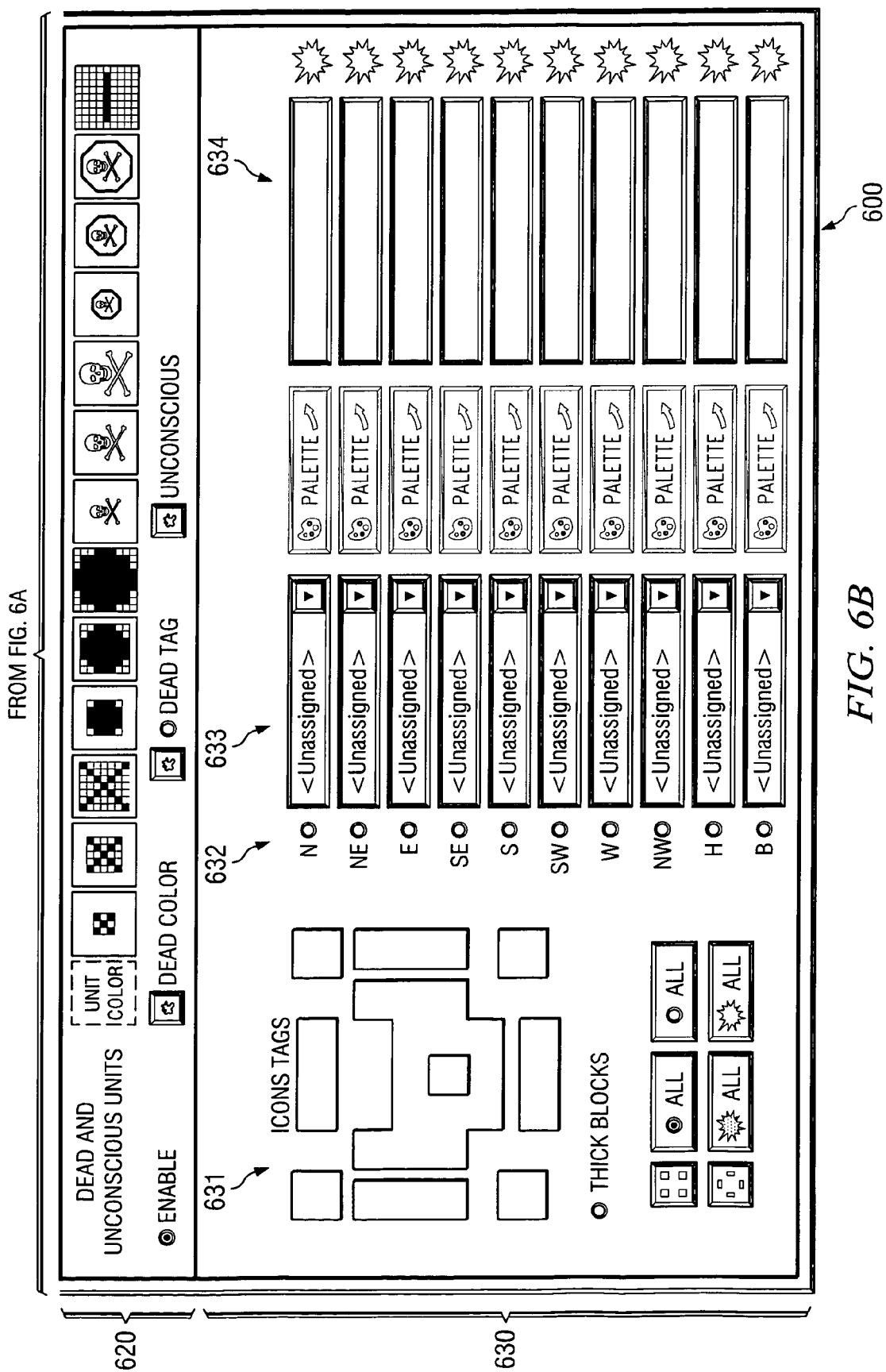

FIG. 6 represents a visualization attributes process 600. Process 610 determines the appearance and color of various icons. Process 620 determines how "dead" icons shall appear. Process 630 permits the user to assign "tags" to icons. As illustrated, each icon 631 may be segmented into differently colored portions. In the example of FIG. 6, each icon may have ten different portions (n, ne, e, se, s, sw, w, nw, head, and body). Each portion may be associated with a different attribute, for example, one or more of the personality attributes discussed below in connection with FIG. 13. That attribute is then assigned a color 634 so that the user can easily view the attributes of the units during a runtime scenario.

Volatile attributes, such as those discussed below in connection with FIG. 14, may be assigned a color range. For example, a unit that has an anger attribute may change color as he or she becomes more angry. As another example, if units exceed a certain level of the "cooperative" attribute, those units can turn red. Other visual feature of an icon, such as whether one of its tags flashes on and off, can be used to visualize an attribute or change in attribute. During run time, stimulation process 14 can be used to affect attributes.

Figure 7A:
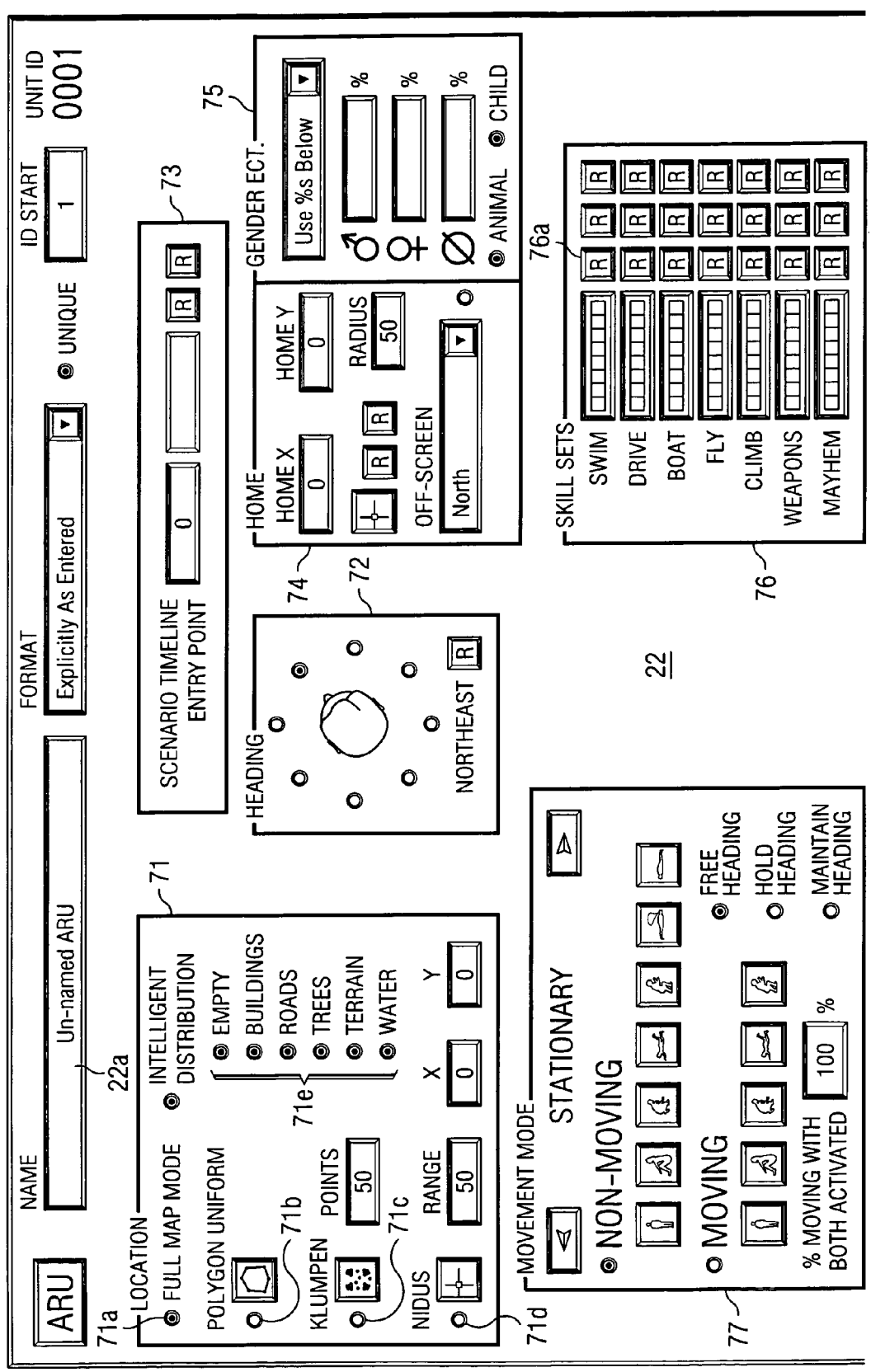
FIG. 7 illustrates the location and movement processes for unit generation.
Figure 7B:
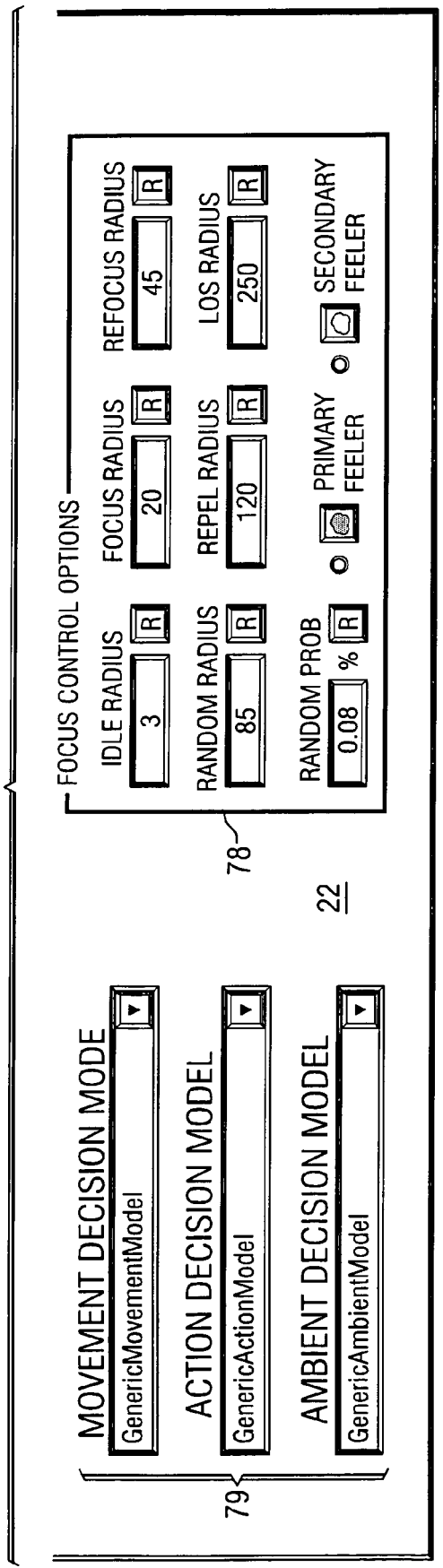

FIG. 7 illustrates additional steps of the runtime unit generation process 22. It is assumed that a map has been selected as described above in connection with FIG. 3. The user may identify the group with a name 22*a*. It should be understood that a "group" may comprise a single unit or more.

A location process 71 is used to spatially locate the units on map 30. There are four location modes, as indicated by buttons 71*a*-71*d*. Full map process 71*a* distributes the units over the entire map 30. Polygon process 71*b* permits the user to draw a polygon on map 30 and places the units within the polygon. A klumpen process 71*c* places the units in clumps. A nidus process 71*d* centers the units at a point on map 30 and thins them away from that point. Intelligent distribution buttons 71*e* permit the user to specify whether units may be spatially located in or on various features of map 30, such as buildings, trees, and water.

A heading process 72 permits the user to determine a heading direction for the units. Alternatively, a random heading may be selected. A timeline entry process 73 permits the user to specify when the group appears in the scenario. The user may also specify the duration of the group in the scenario. Alternatively, the user may specify that the group appear at random distribution (uniform or normal). A "home"

process 74 determines where the group will go after their time in the scenario. A gender process 75 permits the user to specify gender, or whether the unit is an animal or child.

A skills process 76 permits the user to specify which, if any, of a set of listed skills the group shall have. Examples of skills are swim, drive a vehicle, operate a boat, fly an aircraft, climb, operate various weapons, martial arts, and mayhem. The latter represents generalized hand fighting skills. Randomized buttons 76a may be used to distribute levels of skills among the group.

A movement process 77 permits the user to specify how the group moves during a scenario. Units may be stationary (moving or non-moving). Although other movement modes are not shown, they may include: idle, focus path, focus point, random, vehicular, and unit derived focus. In idle mode, the units are moving but without focus. In focus path mode, focus control tools 78 permit the user to specify a path, speed, and time of movement within the scenario.

The attributes of the unit may also make their movement "self determining", using scenario action programming. Various decision models 79 may be used to control the movement, action, and ambient behavior of each unit. For example, programming of the movement model might cause an aggressive person to decide to move toward a heckler. Each movement mode has different set of associated models. For example, the decisions made by stationary units are of a different nature than those made by units that are idle or on a focus path.

FIG. 8 illustrates an event log process 801, which is part of scenario process 23. The user can use process 801 to enter and view events, such as stimuli, that affect the aggregate.

Figure 9A:
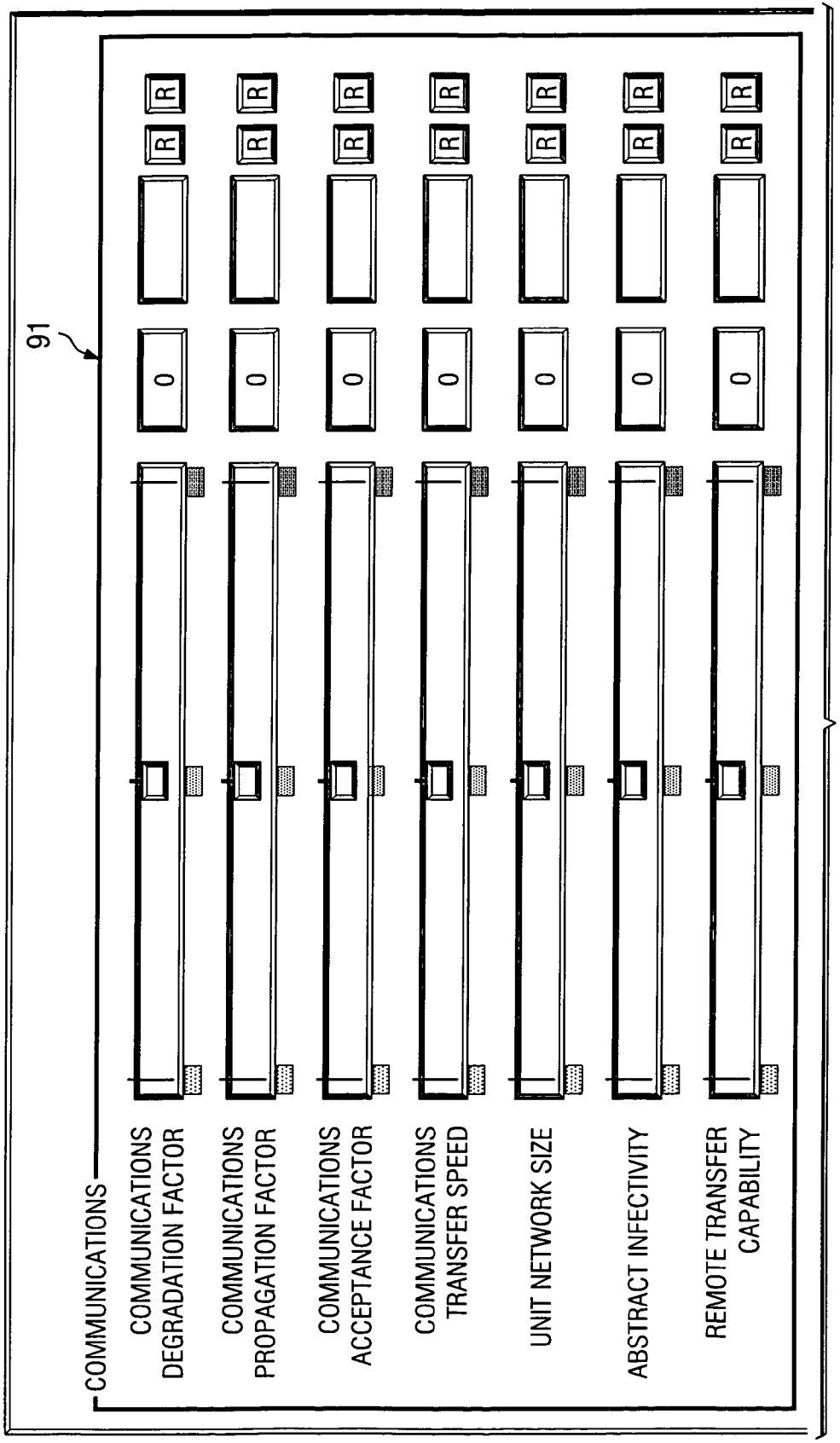
FIG. 9 illustrates the communications attributes process for unit generation.
Figure 9B:
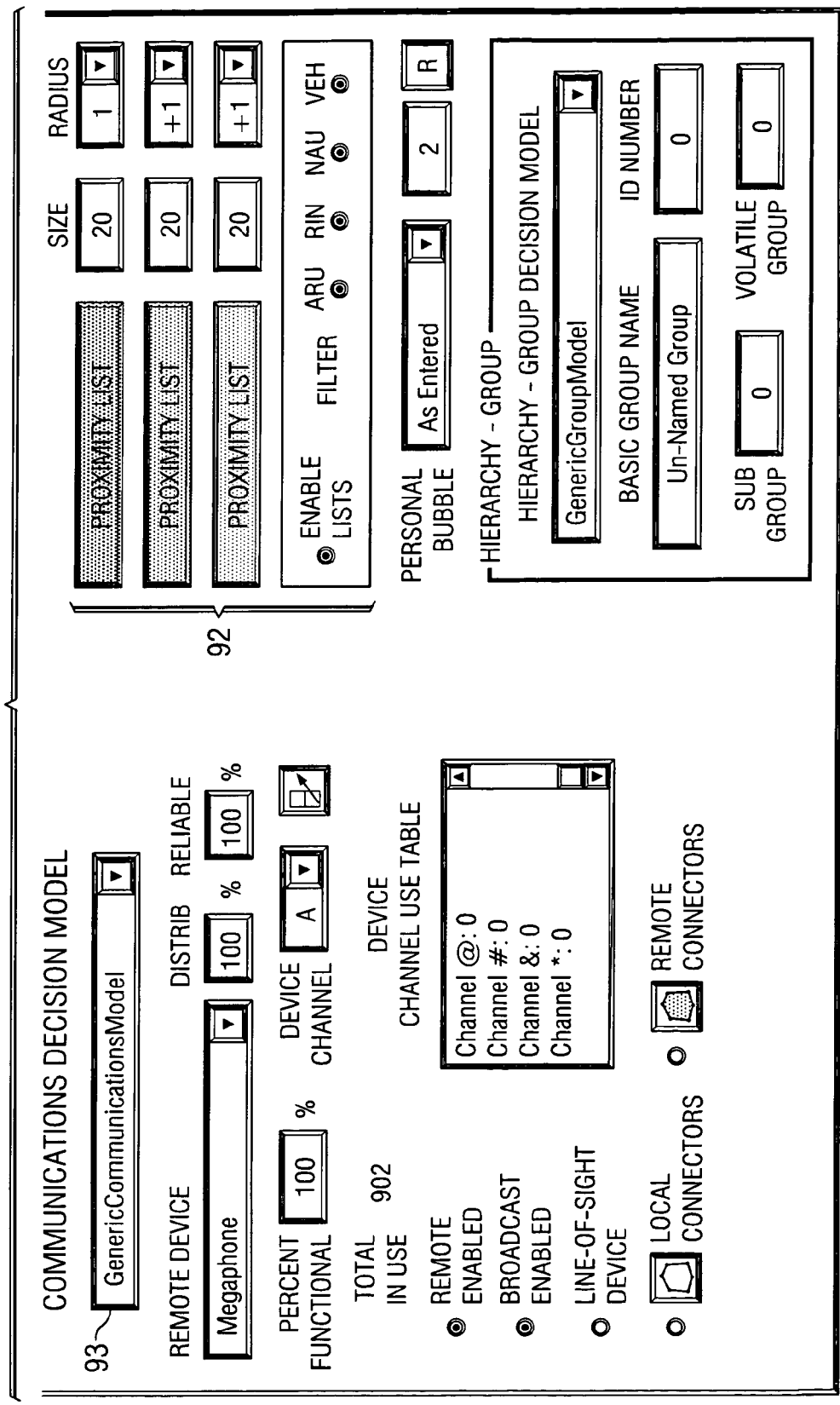

FIG. 9 represents communications process 90. A communications efficacy selector process 91 permits the user to specify levels of communications characteristics such as degradation, propagation, acceptance, transfer speed, network size, abstract inefectivity (such as by body language), and remote transfer capability. Levels and ranges may be assigned in a manner similar to personality attributes. Proximity lists 92 may be used to determine spatial distances for communications. Communications models 93 may also be selected, and used to determine communications decisions by one or more units.

Figure 10:
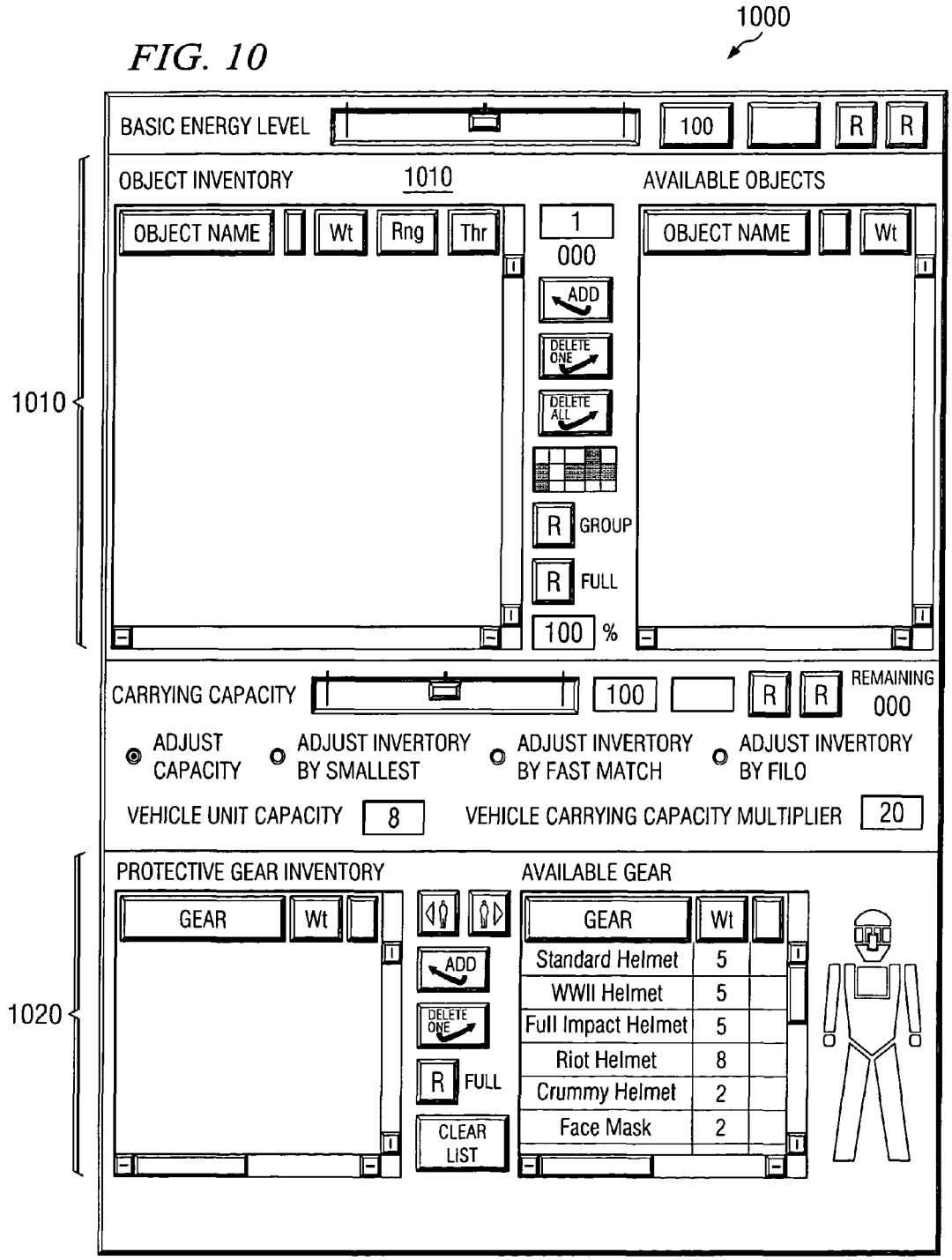
FIG. 10 illustrates the objects and gear processes for unit generation.

FIG. 10 represents an objects attributes process 1000. Using various tools of process 1000, the user can select objects associated with units. Objects inventory 1010 contains a large menu of available items. For a group, the user can determine whether a particular type of object will be assigned randomly among the units, or, whether a number of different objects will be assigned randomly. A gear process 1020 determines what units will wear, such as gear associated with a uniform.

Figure 11:
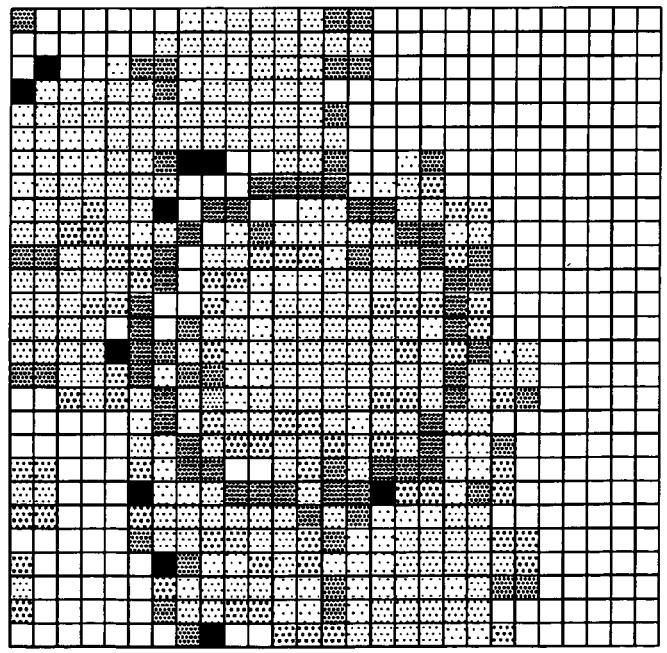
FIG. 11 illustrates the scenario process spreads and displays communications among units of a crowd.

FIG. 11 is a communications process. Referring again to FIG. 2 and 9, scenario process 23 can access communications attributes to determine and display the spread of a particular communications among units. The introduction of a communications message can be by means of stimulation process 14. Different colors can be used to assign knowledge of communications to units.

Figure 12:
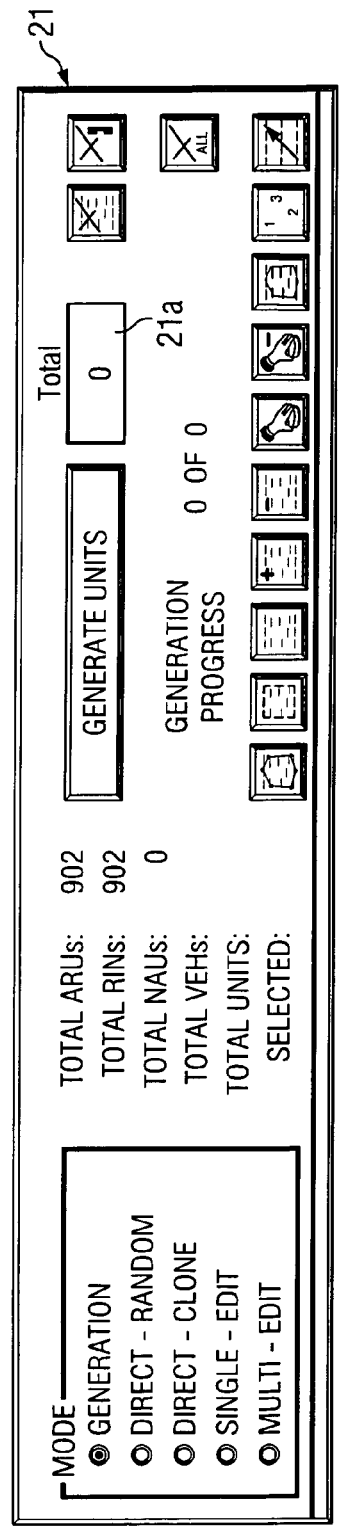
FIG. 12 illustrates the global aspects of a group during unit generation.

FIG. 12 is a global values process 21 for entering and viewing aggregate and group totals. Process 21a permits the user to specify how many units are currently being generated (or edited) as a group. Screen 21 also displays the total number of units in the aggregate.

Figure 13:
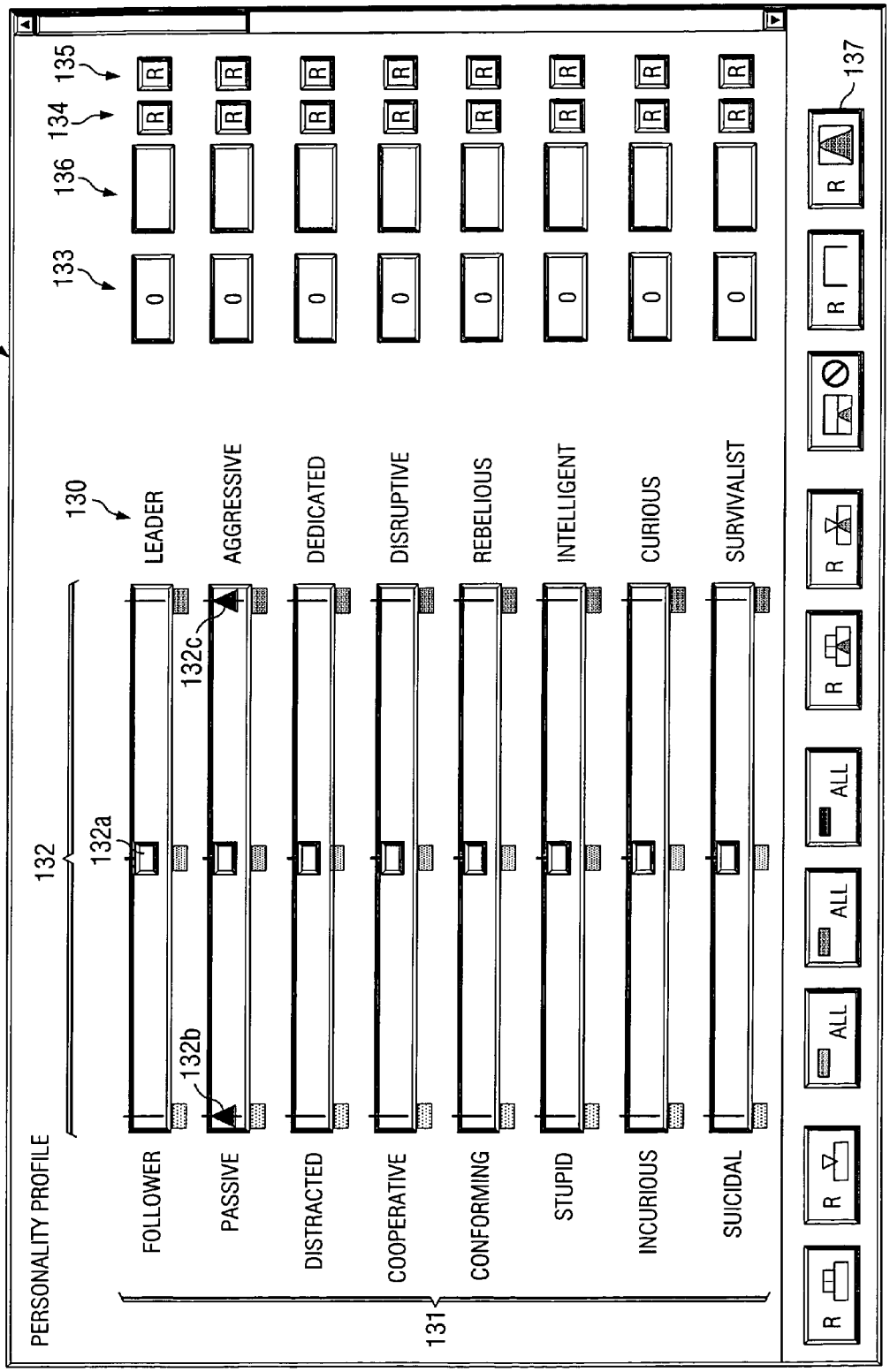
FIG. 13 illustrates the personality attributes process for unit generation.

FIG. 13 illustrates the personality attributes process 1300, which permits personality attributes to be assigned to individuals of the group being generated. Display screen 130 lists a number of attributes 131 that may be associated with units. In the example of FIG. 13 these attributes include: follower, passive, distracted, cooperative, conforming, stupid, incurious, suicidal, demonstrative, confrontational, no respect for innocents, peaceful, poor fighting skills, unattractive, flighty, loner, secretive, frail, agrophobic, and medioblivious.

Value scale selector 132 permits the user to specify an intensity value (or range of values) for each attribute. Each attribute in list 131 has an associated value scale selector 132. In the example of this description, the intensity values may range from −100 to +100.

Likewise, each attribute in list 131 has an associated value selection box 133. Value selection boxes 133 permit the user to specify a particular intensity value. For example, as illustrated in FIG. 13, each attribute has the value "0", giving all individuals in the group a mid-range (neutral) level of that attribute. The sliders 132a in scale selector 132 are automatically positioned at "0".

Buttons 134 and 135 are range distribution buttons. Button 134 results in a uniform distribution, and button 135 results in a Gaussian distribution. If either of these buttons are activated, a left and right range indicators 132b and 132c appear on scale 132, and value indicator 132a disappears. Box 133 becomes a min value entry box, and box 134 appears as a max value entry box. The range indicators can then be independently moved along scale 132 to set max and min intensity values. The distribution (Gaussian or uniform) will be within the selected range (between the min and max values). Alternatively, values can be entered into boxes 133 and 136. The values entered into boxes 133 and 136 will cause indicators 132b and 132c to change, and moving the indicators will cause the values in the boxes to change.

In the example of this description, for Group I (100 units), and for the "follower" attribute in list 131, by selecting button 135 and a range of −50 to 50, the user will have a group of individuals with a Gaussian distribution of leaders and followers within the group. The units will have follower attribute values ranging from −50 to 50. During crowd modeling, a particular group can also be modified using display 130, such as by changing an attribute and stimulating or otherwise activating the crowd with the new attribute.

Various settings buttons 137, shown at the bottom of display 130 implement various statistically based attribute settings. For example, button 137 may be used to set all attributes to a single value, but with a Gaussian distribution among attributes. This permits all individuals within a group to be assigned all the attributes on list 131 with a single button. Other buttons 137 can be used to randomize attribute settings (absolute values or ranges) so as to eliminate bias of the user assigning the settings.

Figure 14B:
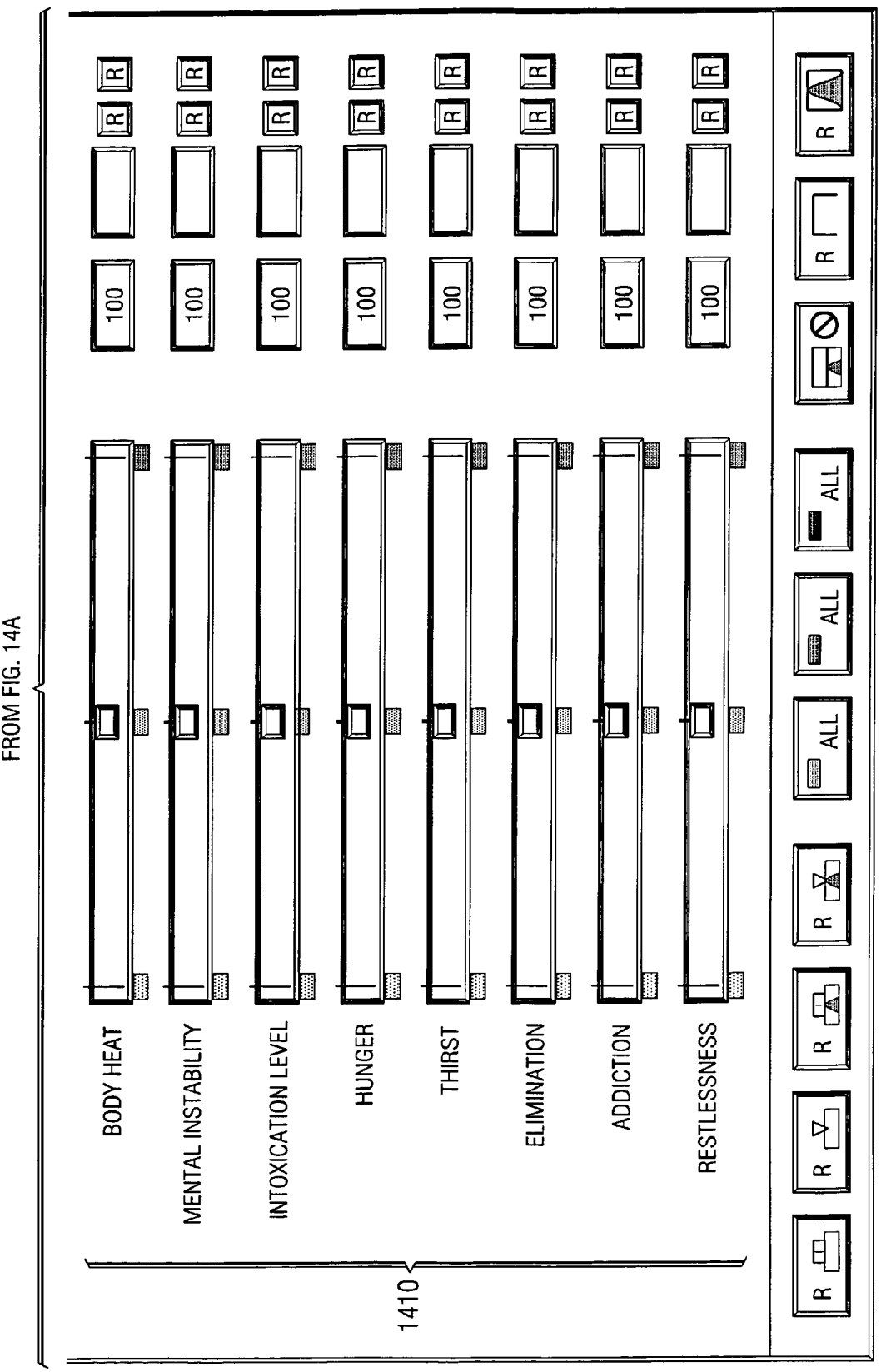
FIG. 14 illustrates the volatile traits process for unit generation.

FIG. 14 represents a volatile traits process 1400, which permits the user to assign values to units for volatile traits 1410. Example of volatile traits are anger level, threat perception, demonstration, confrontation, vocalization, destructivity, incendiary tendency, looting, pain, body heat, mental instability, intoxication, hunger, thirst, elimination, addiction, and restlessness. As compared to the personality attributes of FIG. 13, volatile traits change in response to stimulus provided by process 14. In a manner similar to personality traits of process 1300, however, volatile traits can be assigned with absolute values or distributed values as described above. Process 13 may be programmed so that a unit with a certain personality attribute (such as aggression) responds differently when stimulation process 14 stimulates a volatile trait (such as anger) of that unit.

Figure 15A:
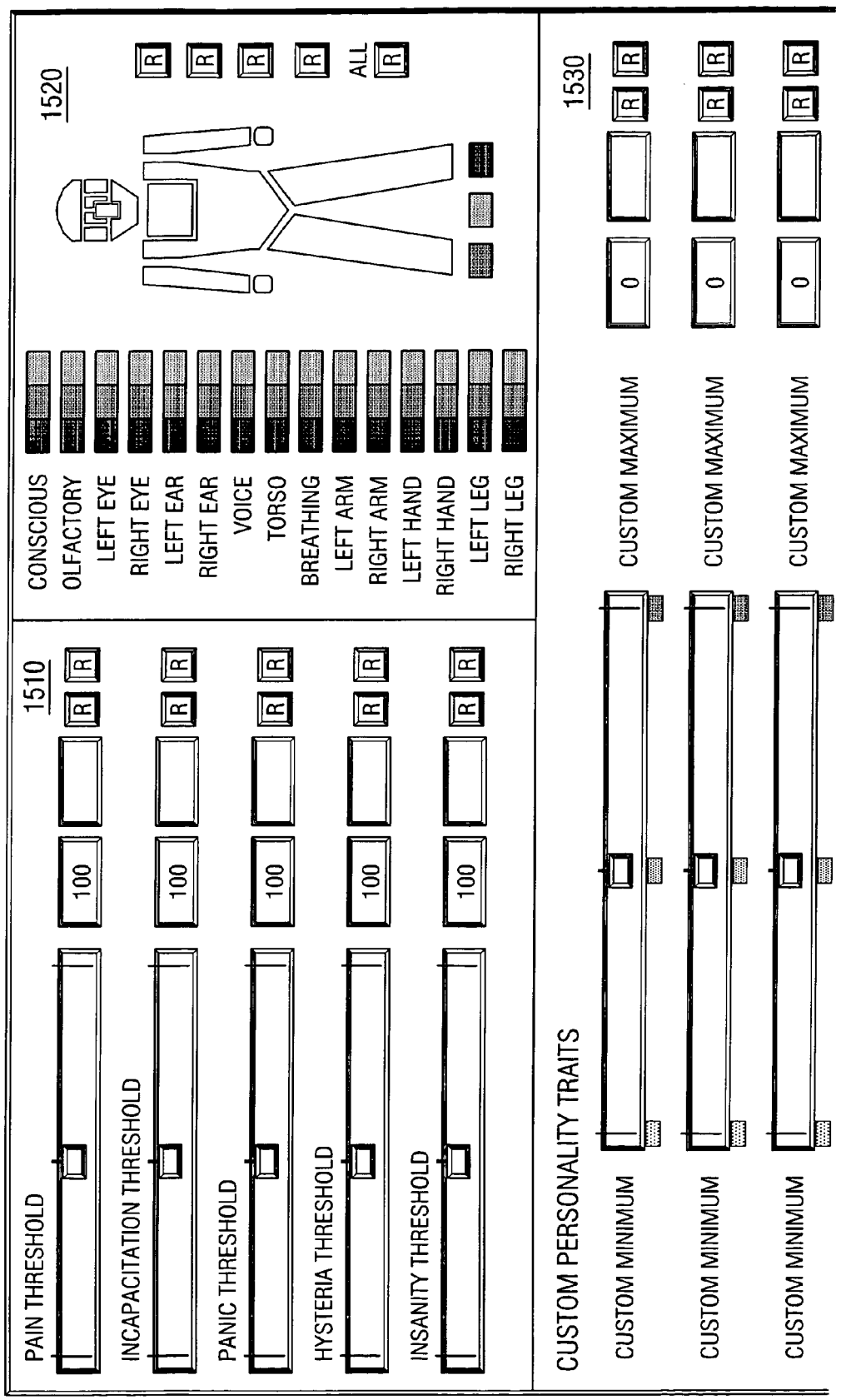
FIG. 15 illustrates the physical threshold process for unit generation.
Figure 15B:
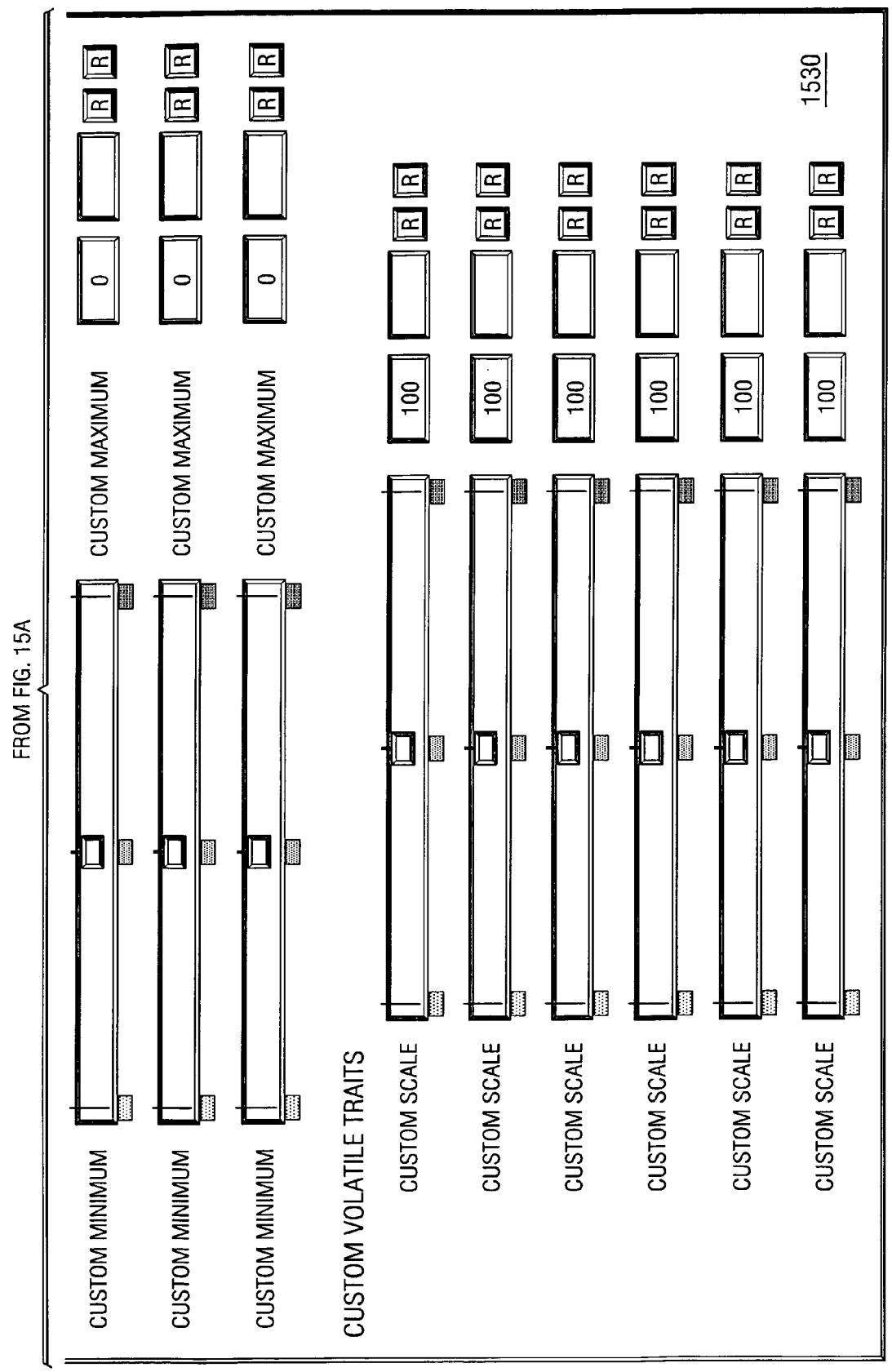

FIG. 15 represents additional processes that may be used during unit generation process 11. A physical traits process 1510 permits the use to set threshold for physical responses that are affected by stimulation process 14. These include responses such as pain, incapacitation, panic, hysteria, and insanity. A tagging process 1520 may be used to color portions of an icon to indicate the status of these physical traits. Other attributes, such as personality or gear, may be used by scenario process 13 to determine how a unit responds to stimulation generated by stimulation process 14.

Customized attributes process 1530 permits the user to create customized attributes.

What is claimed is:

1. A computer-implemented method of generating a model of a group of persons or animals, such that each of the persons or animals has at least one attribute, comprising:
   generating individual models of units of the group, each unit representing a person or animal;
   storing a set of possible attributes to be associated with the units;
   displaying a list of the attributes, the display further having a minimum value entry mechanism and a maximum value entry mechanism associated with each attribute;
   receiving data from a user, via the minimum value entry mechanism and the maximum value entry mechanism, representing a group-level range of values for a selected attribute;
   displaying at least one distribution entry mechanism, operable to receive input from the user representing a desired distribution type of attribute intensity values;
   receiving data from the user representing the desired distribution type;
   calculating an intensity value of the attribute for units of the group, based on the desired distribution type, such that the units have intensity values with a distribution among the group consistent with the desired distribution type and within the group-level range; and
   displaying a plurality of the units as icons having a graphical feature representing the selected attribute.

2. The method of claim 1, further comprising associating each unit with at least one decision model.

3. The method of claim 2, wherein a unit's decision model accesses that unit's intensity value to determine an action of that unit.

4. The method of claim 1, further comprising applying a stimulus to the group, such that units having different attributes respond differently to the stimulus.

5. The method of claim 1, wherein the group-level range is a single value.

6. The method of claim 1, further assigning a skill to the units, by assigning a distribution of a skill among units of a group.

7. The method of claim 1, wherein the minimum value entry mechanism and the maximum value entry mechanism are data entry boxes.

8. The method of claim 1, wherein the minimum value entry mechanism and the maximum value entry mechanism are moveable sliders on a displayed scale of values.

9. The method of claim 1, wherein the attribute is one of the group of: personality, communications characteristics, or volatile traits.

10. The method of claim 1, wherein the distribution type is uniform or Gaussian.

11. A computer system for generating a model of a group of persons or animals, such that each of the persons or animals has at least one attribute, comprising:
    a scenario process for generating a spatially located scenario;
    a unit generation process for generating units of the group, each unit representing a person or animal; and
    a stimulation process for applying stimuli to the group;
    wherein the unit generation process is programmed to perform the following steps:
    to store a set of possible attributes to be associated with the units;
    to display a list of the attributes, the display further having a minimum value entry mechanism and a maximum value entry mechanism associated with each attribute;
    to receive data from a user, via the minimum value entry mechanism and the maximum value date entry mechanism, representing a group-level range of value for a selected attribute;
    to display at least one distribution entry mechanism, operable to receive input from the user representing a desired distribution type of attribute intensity values;
    to receive data from the user, representing the desired distribution type;
    to calculate an intensity value of the attribute for units of the group, based on the desired distribution type, such that the units have intensity values with a distribution among the group consistent with the desired distribution type and within the group-level range; and
    to display a plurality of the units as icons having a graphical feature representing the selected attribute.

12. The system of claim 11, wherein the scenario process accesses a separate decision model for each unit.

13. The system of claim 12, wherein a unit's decision model accesses that unit's intensity value to determine an action of that unit.

14. The system of claim 11, wherein the stimulation process applies a stimulus to the group, such that units having different attributes respond differently to the stimulus.

15. The system of claim 11, wherein the group-level range is a single value.

16. The system of claim 11, wherein the unit generation process is used to assign a skill to each units, by assigning a distribution of a skill among units of a group.

17. The system of claim 11, wherein the minimum value entry mechanism and the maximum value entry mechanism are data entry boxes.

18. The system of claim 11, wherein the minimum value entry mechanism and the maximum value entry mechanism are moveable sliders on a displayed scale of values.

19. The system of claim 11, wherein the attribute is one of the group of: personality, communications characteristics, or volatile traits.

20. The system of claim 11, wherein the distribution type is uniform or Gaussian.

* * * * *